US011938985B2

(12) United States Patent
Spencer

(10) Patent No.: US 11,938,985 B2
(45) Date of Patent: Mar. 26, 2024

(54) SMART CAM FOR DIGITALIZATION OF A GATE MECHANISM

(71) Applicant: Siemens Mobility, Inc., New York, NY (US)

(72) Inventor: Daniel Spencer, Pittsburgh, PA (US)

(73) Assignee: Siemens Mobility, Inc., New York, NY (US)

( * ) Notice: Subject to any disclaimer, the term of this patent is extended or adjusted under 35 U.S.C. 154(b) by 1280 days.

(21) Appl. No.: 16/437,835

(22) Filed: Jun. 11, 2019

(65) Prior Publication Data

US 2020/0391776 A1 Dec. 17, 2020

(51) Int. Cl.
| | |
|---|---|
| *B61L 29/10* | (2006.01) |
| *B61L 29/04* | (2006.01) |
| *B61L 29/08* | (2006.01) |
| *B61L 29/24* | (2006.01) |
| *G01L 3/00* | (2006.01) |

(52) U.S. Cl.
CPC ............... *B61L 29/10* (2013.01); *B61L 29/04* (2013.01); *B61L 29/08* (2013.01); *B61L 29/24* (2013.01); *G01L 3/00* (2013.01)

(58) Field of Classification Search
CPC .......... B61L 29/04; B61L 29/08; B61L 29/10; B61L 29/24
See application file for complete search history.

(56) References Cited

U.S. PATENT DOCUMENTS

| | | | |
|---|---|---|---|
| 4,090,685 A | 5/1978 | Pappas | |
| 2005/0284987 A1* | 12/2005 | Kande | B61L 29/16 246/125 |

FOREIGN PATENT DOCUMENTS

EP 2003038 A2 12/2008

* cited by examiner

*Primary Examiner* — Robert J McCarry, Jr.

(57) ABSTRACT

A highway grade crossing gate mechanism having a smart cam system capable of measuring a parameter of the gate mechanism in real time is provided. The gate mechanism includes a DC motor, a cam system, and a controller. The DC motor is coupled to a main shaft for driving a gate arm between a vertical position and a vertical position. The cam system includes manually adjustable cams coupled to the main shaft that move contacts to open or close at some preset angular rotation in order to set operational features of a crossing gate. An internal sensing device is disposed internal to the cam system measuring a parameter of the gate mechanism in real time. A controller controls the motor and receives and stores the parameter. The parameter may be transmitted to an external network giving accurate feedback of the state of the gate mechanism in real time.

9 Claims, 3 Drawing Sheets

SMART CAM FOR DIGITALIZATION OF A GATE MECHANISM

BACKGROUND

1. Field

Aspects of the disclosure generally relate to a highway grade crossing gate mechanism and more particularly to a gate mechanism including a smart cam system for digitalization of the gate mechanism.

2. Description of the Related Art

An automatic crossing gate serves as a barrier across a highway when a train is approaching or occupying a crossing. The crossing gate is reflectorized with 16-inch diagonal or vertical red and white stripes. To enhance visibility during darkness, three red lights are placed on the gate arm. The light nearest to the tip burns steadily; the other two flash alternately. The crossing gate is combined with a standard flashing light signal that provides additional warning before the arm starts to descend, while the gate arm is across the highway, and until the gate arm ascends to clearance. A gate mechanism contains mechanical and electrical devices to control the gate. The gate mechanism is either supported on the same post with the flashing light signal or separately mounted on a pedestal adjacent to the flashing light signal post.

In a normal sequence of operation, the flashing light signals and the lights on the gate arm in its normal upright position are activated immediately upon the detection or approach of a train. Industry standards require that the gate arm shall start its downward motion not less than 3 seconds after the signal lights start to operate; shall reach its horizontal position before the arrival of the train; and shall remain in that position as long as the train occupies the crossing. When the train clears the crossing, and no other train is approaching, the gate arm shall ascend to its upright position normally in not more than 12 seconds, following which the flashing lights and the lights on the gate arm shall cease operation.

Currently, all highway grade crossing gate mechanisms in the USA use cam and contacts to control various features in a crossing gate. Additionally, relays are utilized to switch circuits that drive a motor or compound PL/field coil motor to raise and lower a gate arm. The cam/contact arrangements are used for position indication of the gate arm which in turn control features at the crossing site such as the warning bell, flashing lights, etc. With traditional cam/contact arrangements, the resolution of the rotational position of the gate arm is limited to that derived from the combination of the cams. The arrangement works based on discrete signals where a contact opens or closes at an adjustable position. Thus, the position of the gate arm can only be determined to a range of values. For advanced analytics of the performance of the gate mechanism, this does not suffice. The resolution needed would require more cams than could reasonably fit within the gate mechanism enclosure.

Therefore, there is a need for a highway grade crossing gate mechanism that includes features to more accurately gather information about the position of the gate arm.

SUMMARY

Briefly described, aspects of the present disclosure relates to a highway grade crossing gate mechanism and a method of automatically determining torque of the main shaft of a highway grade crossing gate mechanism.

A first aspect of provides a highway grade crossing gate mechanism. The gate mechanism includes an electric motor coupled to a main shaft for driving a gate arm between a vertical position and a horizontal position. The gate mechanism also includes a smart cam system, the smart cam system including a plurality of manually adjustable cams coupled to the main shaft that move contacts to open or close at some preset angular rotation in order to set operational features of the crossing gate. Additionally, the smart cam system includes an internal sensing device disposed internal to the cam system measuring a parameter of the gate mechanism in real time. A controller including at least one processor is coupled to both the electric motor and the cam system in order to control the motor as well as receive and store the parameter of the gate mechanism.

A second aspect of provides a method of automatically determining a torque of a main shaft of a highway grade crossing gate. The method includes the steps of providing a highway grade crossing gate mechanism as described above coupled to a gate arm to control rotation, the gate arm 90 degrees from a horizontal position to a vertical position and vice versa. An internal sensing device disposed within a smart cam system of the gate mechanism measures the angular position of the main shaft of the gate mechanism in real time. The angular position of the main shaft is received by the at least one processor of the PCB. In addition, a current sensing device measures a current of the motor which is received by the processor. Utilizing both the current of the motor and the angular position a torque of the main shaft and hence the gate arm may be calculated.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Broadly, a highway grade crossing gate mechanism including a smart cam system is presented. The smart cam system includes an internal sensing device to measure a parameter of the gate mechanism in real time during operation of the gate mechanism. The gate mechanism includes at least one controller to control an electric motor, which in turn controls a gate arm, and to receive and store the parameter of the gate mechanism. An external device may be in communication with the controller to receive the parameter and may display and analyse the data to provide feedback to a railroad operator in real time.

Figure 1:
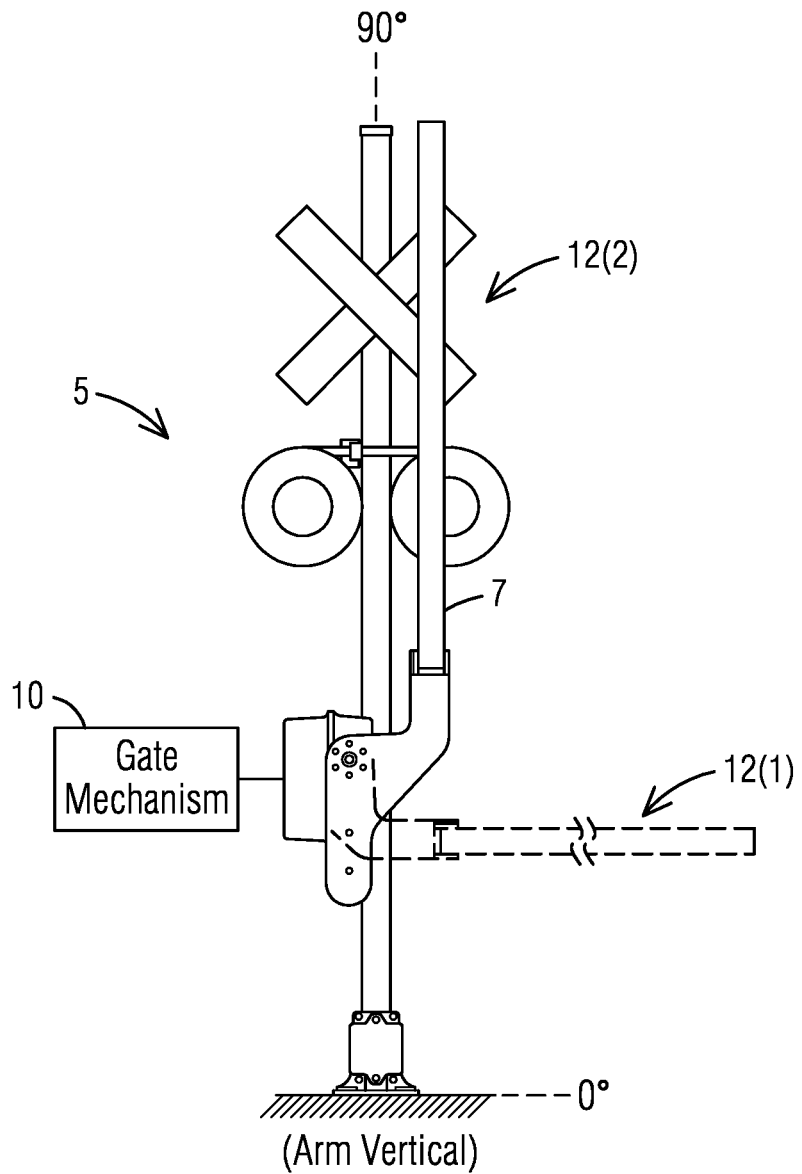
FIG. 1 illustrates a schematic representation of a highway grade crossing gate system with a railroad crossing gate arm in a vertical/horizontal position.

Referring to FIG. 1, a highway grade crossing gate system 5 for controlling rotation of a railroad crossing gate arm 7 is shown. The highway grade crossing system 5 comprises a highway grade crossing gate mechanism 10 coupled to the railroad crossing gate arm 7 to control rotation of it 90 degrees from a horizontal position 12(1) to a vertical position 12(2) and vice versa. It should be appreciated that the horizontal position 12(1) and the vertical position 12(2) may include slight deviations from being truly parallel or perpendicular, respectively, to the ground.

Figure 2:
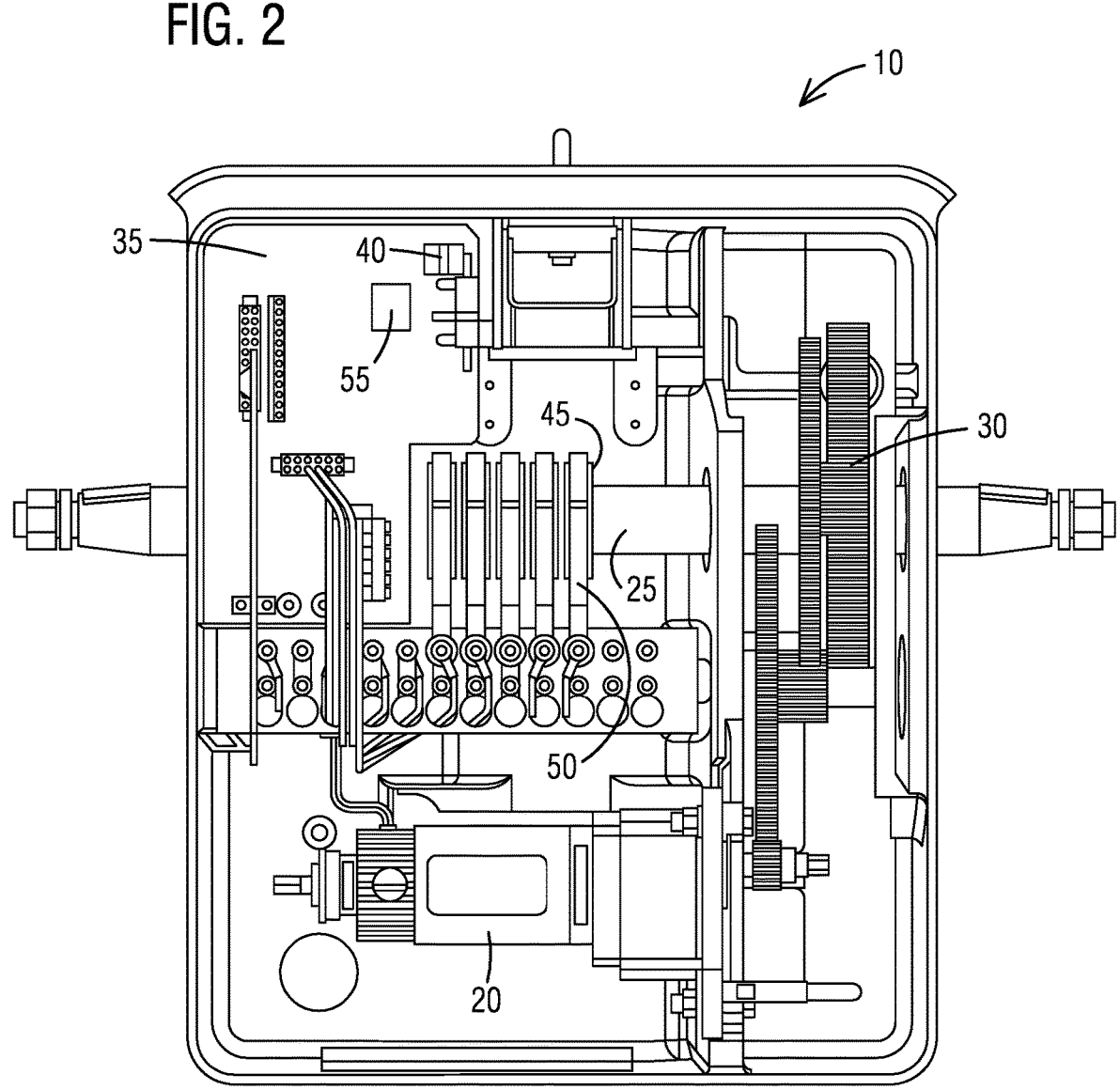
FIG. 2 illustrates a schematic representation of a gate mechanism.

Referring to FIG. 2, a schematic representation of a highway grade crossing gate mechanism 10 is shown in accordance with an exemplary embodiment of the present invention. The gate mechanism 10 includes an electric motor 20 such as a DC motor coupled to a gear train 30 to drive the railroad crossing gate arm 7 up and down. For illustrative purposes only, the motor throughout this disclosure will be referred to as a DC motor, however, an AC motor may also be utilized in a gate mechanism as described. Manually adjustable cams 45 on a main shaft 25 move contacts 50 (open or closed) at some preset angular rotation of the railroad crossing gate arm 7. Depending on the position of individual contacts 50, outputs are provided for flashing lights, a bell, and other features. The gate mechanism 10 further comprises a control printed circuit board (PCB) 35 coupled to the DC motor 20. The control PCB 35 includes at least one processor 40 and other relay-based controls to control the DC motor 20. The processor 40 may be configured to receive an accurate real time angular position of the rail crossing gate arm 7. In an embodiment, a further processor 55, such as an IoT edge device, may be disposed on the control PCB 35 to receive the angular position of the railroad crossing gate arm 7. The further processor 55 may be in communication with an external network transmitting the angular position data to the external network.

In an embodiment, the gate mechanism 10 includes a smart cam system including the plurality of manually adjustable cams 45 coupled to the main shaft 25 as well as an internal sensing device 100 disposed internal to the cam system capable of measuring a parameter of the gate mechanism 10 in real time during operation of the crossing gate system. An external device may receive the parameter and display and/or analyse the data so that a railroad operator may have an accurate real time measurement of the parameter.

Figure 3:
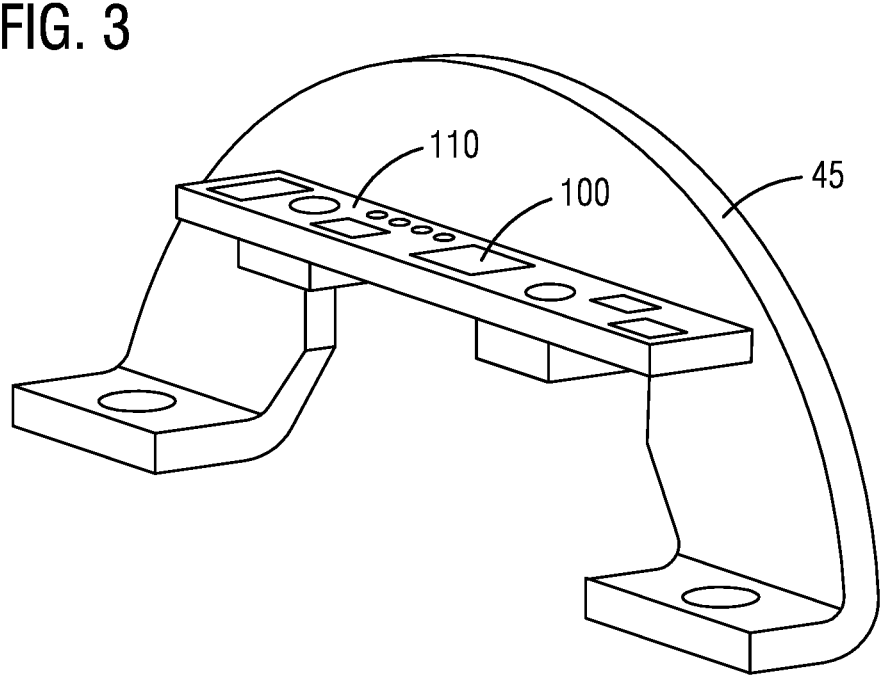
FIG. 3 illustrates a sectional perspective view of an internal sensing device carried by a cam.

Referring now to FIG. 3, a sectional perspective view of the back portion of a cam 45 is illustrated having an attached control board 110. The control board may be a printed circuit board having electronic components. The control board 110 may include at least an internal sensing device 100, a signal connector, a power source, and a signal conditioner. The control board 110 may be disposed on a back portion of an existing cam. In an embodiment the control board 110 is carried on at least one bracket 120 extending from an interior face of the cam so that the control board is carried on top of the bracket 120. A control board carried by two brackets extending from an interior face of a back portion of the cam 45 may be seen in FIG. 3. In an embodiment, the brackets extend the width of the cam. The brackets may be attached to the cam utilizing attachment means such as bolts, screws, and pins.

In an embodiment, the internal sensing device 100 is a rotational position sensor 100 for measuring an accurate rotational position of the main shaft 25. The rotational position sensor 100 may be a rotational accelerometer measuring the position of the main shaft 25 in real time. The position of the main shaft 25 gives an accurate indication of the gate arm position. A rotational accelerometer is capable of sensing the amount of dynamic acceleration of a rotating object and gives as an output, the angle the shaft is tilted with reference to the axis of the shaft. In an embodiment, the rotational accelerometer provides three axis acceleration data and may be in the form of a 0 to 10V analog output, for example.

Figure 4:
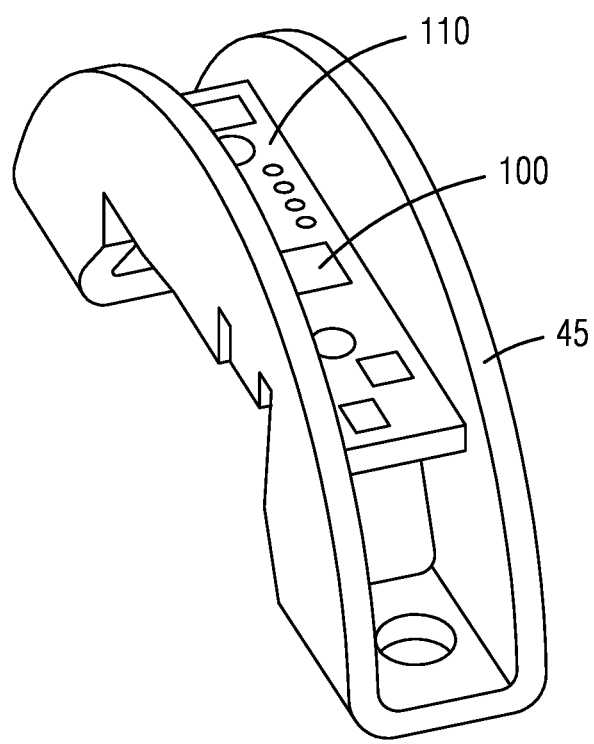
FIG. 4 illustrates a top view of an internal sensing device carried by a cam.

FIG. 4 illustrates a top view of the control circuit board 110 including the accelerometer 100 carried by the interior brackets so that the control board 110 lies across the interior of the cam 45. With this positioning within the back half of the cam, the accelerometer 100 does not interfere with existing gate operation. In an embodiment, an installed crossing gate may be retrofit with the internal sensing device 100. For example, as described above, the control board 110 may be disposed on the back half of an existing cam 45 by a railroad operator after an installation and setup of the crossing gate.

The angular rotation data measured by the internal sensing device may be transmitted to a remote device via the processor 40,55. In an embodiment, the processor 55 may be an IoT edge device in communication with a network in order to transmit the angular rotation data external to the gate mechanism 10. The remote device may then display the data and/or analyse the data. While the disclosure refers to the measured parameter as time based angular rotation data, other sensed data may also be transmitted via the processor to the remote device.

In an embodiment, the gate mechanism may also include a current sensing device 60 for sensing a current drawn by the electric motor 20. In an embodiment, the current sensing device 60 may be disposed on the PCB board 35. Utilizing the angular rotation data of the main shaft 25 and the current of the electric motor 20, a torque of the main shaft 25/gate arm 7 may be determined.

The angular rotation data of the main shaft gives a more accurate indication, i.e., better resolution of the angular position of the gate arm than was previously obtainable simply from the cams and contacts. With this angular rotation data, digitalization techniques may be utilized to improve more manual processes and/or automate processes relating to a highway grade crossing system, for example.

For example, currently, the initial setup and installation of the highway grade crossing gate system, involves an iterative manual process while the railroad employee balances the gate and sets the horizontal and vertical torques of the gate arm. If its not calibrated correctly, the gate arm may not lower to horizontal at the appropriate time or cause an overload on the gear train decreasing the life of the DC motor. If the torque of the arm is known from sensing data, for example, the railroad employee may accurately calibrate the installation torque.

From the angular rotation of the shaft and the current of the DC motor, the torque of the main shaft may be determined. The processor of the PCB may be configured to report the torque including any deviations from normal operation.

In an embodiment, the determined torque may be utilized to determine a broken gate arm or a turned gate arm. For example, a sudden change in the torque load on the motor may be an indication that the gate arm has broken or turned. Upon determination that the gate arm is broken or turned, an alarm may be transmitted via the processor in communication with an network or external device to alert a maintainer or a train operator of an oncoming train. The determined torque may additionally automate crossing inspections. For example, with knowledge of the torque of a gate arm over a period of time, a railroad operator can determine without performing a manual inspection of the gate system onsite whether or not any calibration is needed.

This disclosure addresses the limited resolution currently available regarding the rotational position of a gate arm of a gate crossing system. The disclosed gate mechanism as well as the corresponding method may be used to increase the resolution of the data available pertaining to the position of the gate arm. The data obtained via a rotational sensor disposed in the gate mechanism may be utilized to accurately calibrate the gate arm during an initial setup as well as detecting a broken gate arm or a turned gate arm. Additionally, this data may be used as a secondary indication of the gate arm position for purposes of event recording or state detection. Thus, the system and method described herein produce the data to more fully digitize a gate mechanism of a gate crossing system.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A highway grade crossing gate mechanism, comprising:
    an electric motor coupled to a main shaft for driving a gate arm between a vertical position and a horizontal position;
    a cam system, comprising:
        a plurality of manually adjustable cams coupled to the main shaft that move contacts to open or close at some preset angular rotation in order to set operational features of a crossing gate, and
        a rotational position sensor disposed internal to the cam system measuring a parameter of the gate mechanism in real time; and
    a controller comprising at least one processor coupled to the electric motor and the cam system wherein the controller is configured to control the motor and receive and store the parameter of the gate mechanism,
    wherein the rotational position sensor includes an accelerometer disposed on a control board,
    wherein the control board is disposed on a back portion of a cam of the plurality of cams for measuring an accurate angular position of the main shaft.

2. The gate mechanism as claimed in claim 1, wherein the control board comprises at least the rotational position sensor, a signal connector, a power source, and a signal conditioner.

3. The gate mechanism as claimed in claim 1,
    wherein the accelerometer provides 3-axis acceleration data of the main shaft.

4. The gate mechanism as claimed in claim 1, wherein the angular position of the main shaft gives real time feedback of the angular position of the gate arm.

5. The gate mechanism as claimed in claim 1, further comprising a current sensing device measuring a current of the electric motor.

6. The gate mechanism as claimed in claim 5, wherein a torque of the main shaft is determined by the processor utilizing the current of the electric motor and the angular position of the main shaft.

7. The gate mechanism as claimed in claim 6, wherein the gate arm is adjusted according to a prescribed adjustment based on the determined torque.

8. The gate mechanism as claimed in claim 1, wherein the control board is mounted on brackets coupled to an inner surface of a cam of the plurality of cams.

9. The gate mechanism as claimed in claim 1, wherein the processor is an (IoT) edge device in communication with a network in order to transmit the parameter external to the gate mechanism.

* * * * *